United States Patent [19]
Mazur

[11] Patent Number: 4,573,128
[45] Date of Patent: Feb. 25, 1986

[54] DIGITAL METHOD FOR THE MEASUREMENT AND CONTROL OF LIQUID LEVEL IN A CONTINUOUS CASTING MOLD

[75] Inventor: Chester C. Mazur, White Oak, Pa.

[73] Assignee: United States Steel Corporation, Pittsburgh, Pa.

[21] Appl. No.: 480,988

[22] Filed: Mar. 31, 1983

[51] Int. Cl.[4] .................. G01F 23/00; B22C 19/04
[52] U.S. Cl. .................................. 364/509; 73/295; 164/449; 364/557
[58] Field of Search ............... 364/509, 557; 73/295, 73/292, 291; 164/449, 155, 456, 156

[56] References Cited

U.S. PATENT DOCUMENTS

| | | | |
|---|---|---|---|
| 3,204,460 | 9/1965 | Milnes | 164/449 |
| 3,399,568 | 9/1968 | Wilson | 73/295 |
| 3,864,973 | 2/1975 | Petry | 164/449 |
| 3,921,697 | 11/1975 | Petry | 164/449 |
| 3,946,795 | 3/1976 | Bruderer et al. | 164/449 |
| 4,066,114 | 1/1978 | Dorr et al. | 73/295 |
| 4,126,041 | 11/1978 | Doi et al. | 73/295 |
| 4,306,610 | 12/1981 | Ahmed | 164/155 |
| 4,425,795 | 1/1984 | Albrecht et al. | 73/295 |
| 4,449,404 | 5/1984 | Böhme et al. | 73/295 |
| 4,466,282 | 8/1984 | Kühnel | 73/295 |

FOREIGN PATENT DOCUMENTS 57-66319 4/1982 Japan ..................... 73/295

Primary Examiner—Errol A Krass
Assistant Examiner—Winfield J. Brown, Jr.
Attorney, Agent, or Firm—William F. Riesmeyer

[57] ABSTRACT

A method is provided for measuring and controlling the level of an elevated temperature liquid in a container. The method includes converting electrical voltage signals from temperature sensing means spaced along a wall of the container to digital form. The converted signals are periodically scanned in elevation sequence. From the scanned signals the location is determined of the uppermost sensing means having a signal value of sufficient magnitude to lie below the liquid level. A fraction, F, of the spacing between that sensing means and the next above sensing means is calculated at which the measured liquid level lies. The fraction determined is a function of the converted signal value, Sn-1, a converted signal value, Se, at an estimated location of the liquid level and, So, a converted signal value sufficient to cause the fraction, F, to be at or near zero in value immediately prior to imminent changes in the location of the uppermost sensing means determined to lie below the liquid level.

2 Claims, 2 Drawing Figures

DIGITAL METHOD FOR THE MEASUREMENT AND CONTROL OF LIQUID LEVEL IN A CONTINUOUS CASTING MOLD

BACKGROUND OF THE INVENTION

The present invention relates to a method of measuring and controlling the level of an elevated temperature liquid in a container, and particularly to a method of measuring and controlling the level of molten metal in a vessel, for example, a continuous casting mold.

A system commonly used to measure the level of molten steel in a continuous caster mold utilizes a plurality of thermocouple probes located at uniformly spaced elevations on the mold wall. The probes provide electrical voltage signal outputs corresponding to the thermal profile along the mold wall caused by the liquid steel in the mold. The conventional apparatus for determining the liquid level from the probe output signals is shown in U.S. Pat. No. 3,204,460, Milnes and U.S. Pat. No. 3,399,566, Wilson. These recorder balance slide-wire systems have worked adequately for many years. But, recent changes in casting practices and more stringent process control requirements have established the need for changes in this equipment. Variation in the casting flux and flux buildup on the mold walls, as well as submerged tube pouring practices, have increased the problems associated with determining the level of steel in the mold. Also, false level indications sometimes occur due to sudden mold level and casting speed variations. Perhaps the most common problems are false recorder oscillation and sluggish response due to improper amplifier gain adjustments. Serious consequences can result from poor probe contact or shorted probes.

Recently, a digital method of analyzing the probe signals and determining the liquid level was devised in order to overcome the above-mentioned problems. This method is the subject of a prior application of Wilson and Laycak, commonly assigned with the present application. This prior digital method has been subject to spiking or jumps in the indicated level whenever the indicated level passes through a probe location. This occurs more frequently of course when the desired level in the mold happens to be located at the location of one of the probes instead of between probes. The present application is an improvement in the prior digital method which is designed to overcome the problems just mentioned.

SUMMARY OF THE INVENTION

The method of the present invention includes converting to digital form the electrical voltage signal outputs of temperature sensing means located at uniformly spaced elevations on a wall of a container above and below the expected level of elevated temperature liquid in the container. The converted signals are periodically scanned in elevation sequence, preferably in a direction from the top toward the bottom of the container. Then, the location of the uppermost sensing means, n, having a converted signal value, $S_n$, of sufficient magnitude to correspond to a temperature below the level of liquid is determined. Desirably, this is accomplished by taking the average, m, of at least one of the highest converted signal values, preferably three of the highest values. That average figure is then multiplied by a fraction, p, to arrive at a converted signal value, $S_e$, at which the liquid level is estimated to normally lie. The fraction, p, is arrived at based on observation and prior experience. After the location, n, is determined, a fraction, F, of the spacing between, n, and the next above sensing means, n−1, is calculated at which the measured liquid level lies. The fraction, F, is calculated as a function of the converted signal values, $S_{n-1}$, $S_e$ and $S_o$. Preferably, the fraction, F, is defined by the relation, $$F = \frac{(S_n - 1) - S_o}{S_e - S_o}$$

where $S_{n-1}$, is the converted signal value of the sensing means, n−1; $S_e$, is the converted signal value at a location where the liquid level is estimated to lie based on the average, m, of at least one of the largest converted signal values on each scan; and, $S_o$, is a converted signal value sufficient to cause the numerator of the fraction, F, to be at or near zero in value immediately prior to changes in the location of the sensing means, n. Preferably, $S_o$, is also calculated as a function of the average, m, of at least one of the highest converted signal values on each scan.

In preferred form, $S_o$, is initially fixed at $S_o = c \times m$ where, c, is chosen to be within a range of from 0 to about 0.50. On subsequent scans, $S_o$ is reset at $S_o = S_n - 1$ whenever, $S_n$, on a particular scan is within a range of from, $S_e$, to a predetermined percentage greater than $S_e$, and is reset at $S_o = S_n - 2$ whenever $S_n - 1$ as determined on each scan falls within the range of from $S_e$ to a predetermined percentage less than $S_e$. $S_o$ remains at these values until it needs to be reset again based on the aforesaid conditions. These adjustments are made so as to assure a smooth transition of indicated level when the actual level in the mold is falling or rising.

The measured liquid level is then determined from, n, and, F, with respect to their location on the container. This may be done according to the relation $L = [n - F - 1](SF) + PD$ where, L, is the measured level, SF is the spacing between sensing means and, PD, is the distance of the first sensing means from the top of the container.

DESCRIPTION OF THE PREFERRED EMBODIMENT

Figure 1:
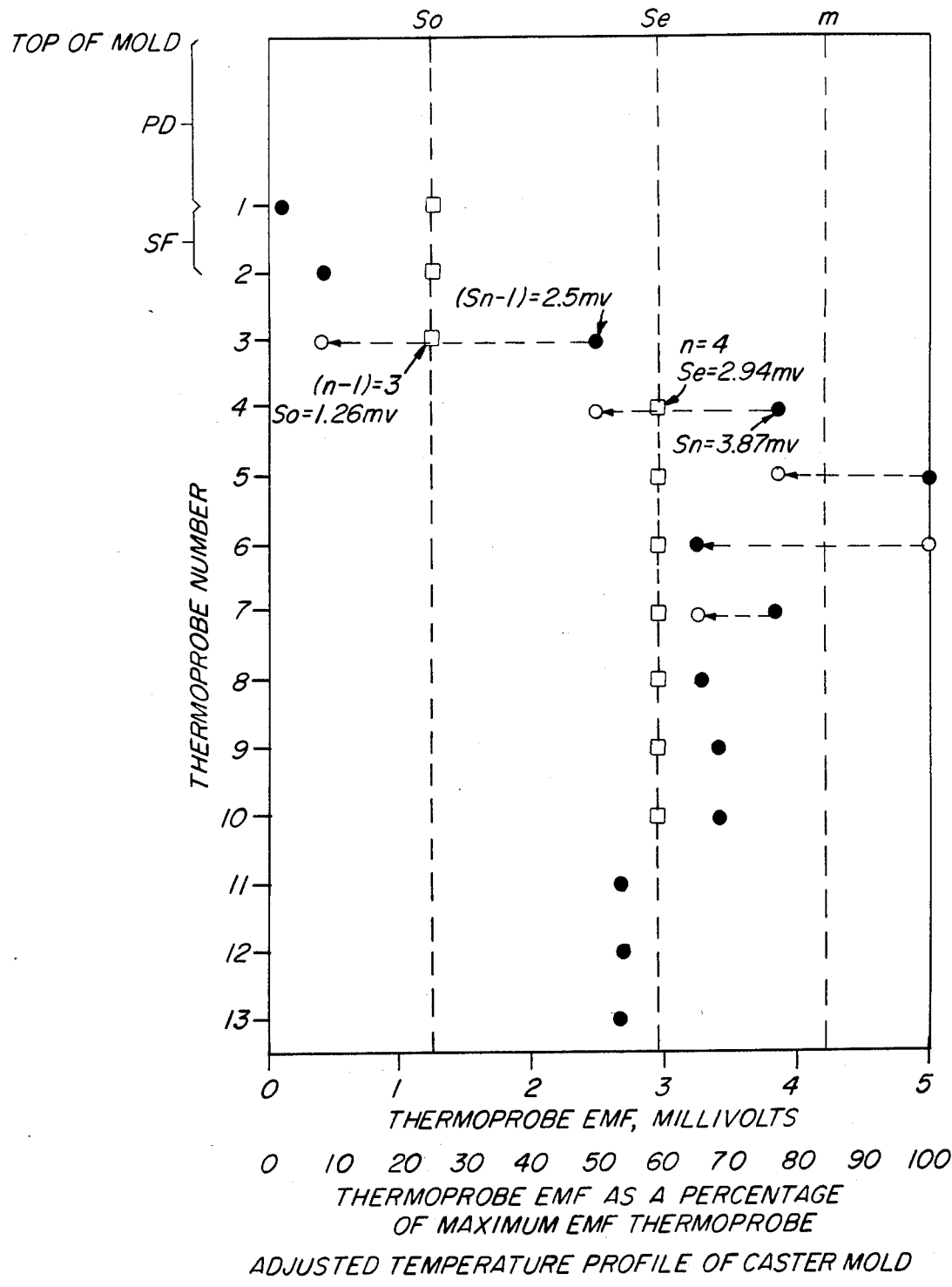
FIG. 1 is a plot of the electrical voltage signals of the various temperature sensing means as modified according to the method of the present invention.

FIG. 1 shows a profile of electrical voltage signals of uniformly spaced thermoprobes located on a continuous casting mold. The probes are of the type disclosed in U.S. Pat. No. 3,797,310, Babcock and Wilson, and are located on a continuous casting mold as shown in U.S. Pat. No. 3,204,460, Milnes and U.S. Pat. No. 3,399,566, Wilson. The specifications of all the aforementioned patents are incorporated herein by reference. As disclosed in a prior commonly assigned application, the probe signals are converted to digital form and periodically scanned in elevation sequence from the top to the bottom of the mold. In the method of the present invention a slightly different way is used to determine the location of the uppermost probe or temperature sensing means, n, having a converted signal value, Sn, sufficient to correspond to a temperature indicative of a location below the level of steel in the mold. The preferred way of the present method is to find the average of at least one of the highest converted signal values on each scan. This value is designated, m. Desirably, m, is calculated as the arithmetic mean of the greatest three signal values on each scan. From, m, two other values are calculated herein which are used as described subsequently. First, Se, is calculated from the relation Se=p×m where, p, is a constant determined by experience and observation to yield a value corresponding to the actual level of steel in the mold. The value of, p, will generally be within a range of from about 0.50 to about 0.90. In our system, p, is equal to about 0.70. The uppermost sensing means found to have a converted signal value greater than, Se, is designated, n.

For the initial scan, another value, So, is calculated from the relation So=c×m, where, c, is a constant of value less than, p, within a range of 0 to about 0.50. In our system, c, has been initially set at 0.3. On subsequent scans, the value of, So, is adjusted so that, So, will be of a converted signal value to cause the numerator of, F, to be at or near zero immediately prior to changes in the location of the sensing means, n.

After determination of the location of sensing means, n, a fraction, F, is calculated which will determine, along with, n, the location of the measured liquid steel level, L, in the mold. F, preferably is determined from the relation, $$F = \frac{(Sn - 1) - So}{Se - So}$$

where Sn−1 is the converted signal value of the sensing means, n−1, immediately above, n. In actual practice, the profile of converted signal values is adjusted as shown in the drawing figure. The adjusted values, Se, and So, are illustrated by boxes at the various probe locations. All probes having a converted signal value greater than, Se, are set at, Se, and all probes having converted signal values less than, So, are set at, So. This expedites calculation of the measured level from the scanned profile. It will be apparent that whenever Sn−1 falls below So, F, would have a negative value. This may occur as, Sn, approaches Se, that is whenever the level of liquid steel is falling in the mold, e.g. from a level between probes 3 and 4 to a level between probes 4 and 5. Illustrative of this are open circle points on the profile shown in the drawing figure representing values during a change in level, in this case a falling level. In the figure, probe 4 is shown to have a new value Sn=2.94. The value of, Se, as calculated from the other open circle points is 2.83 where, m, is 4.04. So, is found to be 1.21. F, then is found to have a negative value which would erroneously cause the measured level to jump about probe 4. To correct this, a new value of, So, is calculated whenever, Sn, approaches to within a predetermined percentage of Se, So, being determined by the relation, So=Sn−1. Substitution of the real-time updated value of, So, in the equation eliminates the possibility of, F, having a negative value. The proximity of, Sn, to, Se, at which this iterative calculation of So, is necessary may be determined by experience and, of course, will be related to the accuracy at which, Se, is estimated. We have found that each recalculation of, So, may only be necessary whenever, Sn, is within the range of, Se, to 1.03 Se in our particular system. Similar adjustments in the value of, So, are necessary on a rising liquid level, i.e. whenever Sn−1 approaches the value of Se. Thus, So, will be reset to avoid the demoninator in the fraction, F, from becoming a negative value. This is accomplished by adjusting, So, to a value So=Sn−2 whenever Sn−1 approaches to within a predetermined percentage of the value of Se. The measured level, L, is then calculated from a relation, L=[n−F−1](SF)+PD where, SF, is the spacing between probes and, PD, is the distance of the first or highest probe in the mold from the top of the mold.

Figure 2:
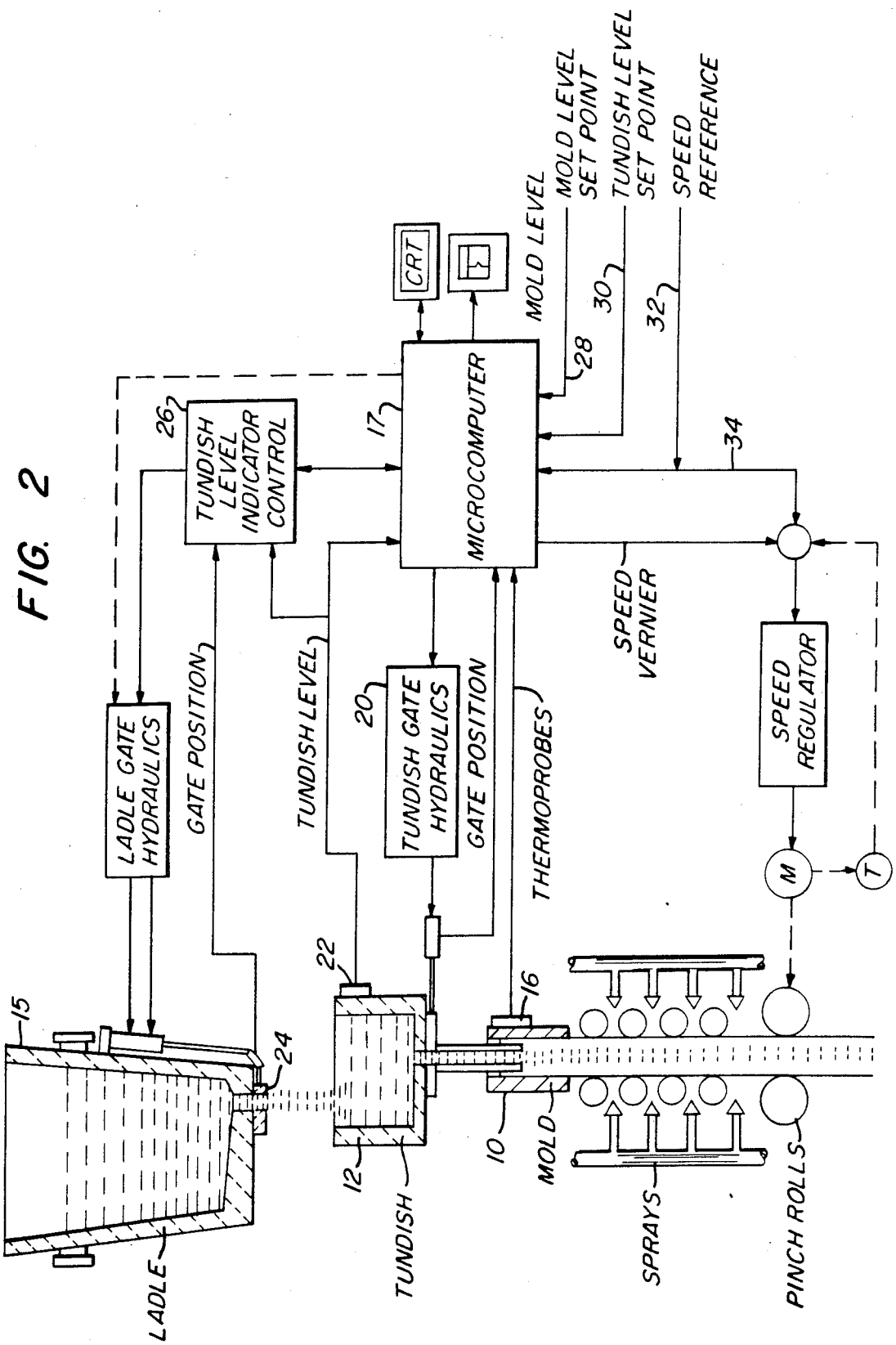
FIG. 2 is a schematic illustration of the preferred flow and speed control system used in the method of this invention.

Finally, the rate of addition and withdrawal of steel to and from the mold is controlled based on the measured level of steel in the mold. For example, this may be accomplished by the method of U.S. Pat. No. 3,300,820, Tiskus and Wilson. FIG. 2 shows a preferred system for regulating the rate of steel into the mold which is another invention made by the inventors herein and will be the subject of a future commonly assigned patent application. In this method it is desired to regulate the casting speed only when the mold level exceeds a preset limit. A measure of the liquid level in the mold is obtained by the digital method just described. An error signal is developed as the difference in a voltage proportional to the measured level and a voltage proportional to the desired (setpoint) level. The error signal has a polarity deviation indicating the direction of deviation between the two. If the measured level is determined to be within predetermined limits, the system continues in a flow regulation mode, maintaining constant casting speed. In this mode a flowcontrol algorithm is used to calculate an output based on the sums of the proportional, integral and derivative functions of the error signal over time and a value that is proportional to the reciprocal of the square root of the change in tundish liquid level. This combined control signal is used to regulate flow rate by changing the position of a slide-gate valve on the tundish. The slide-gate valve is positioned by a hydraulic cylinder which is controlled by either a hydraulic servo valve or a pulse train which steps the cylinder to various positions.

If the mold-level error signal is greater than the deadband limits, the system begins to regulate casting speed while maintaining the tundish slide-gate device in its last position. An alarm signals the operator that speed control is now in operation. The system will not return to the flow control mode until the operator resets the flow control system based upon his clearing the apparent problem in this system. The system, preferably, also has the capability of controlling tundish liquid level by a hydraulic ladle-gate system and suitable tundish liquid level measurement. An example of the latter is the Studsvik EMLI system.

FIG. 2 shows the mold 10, tundish 12 and ladle 15. The mold is fitted with a plurality of thermoprobes 16 providing electrical voltage signal inputs to microcomputer 17. In addition, the computer receives input of the actual gate position, if available, from the tundish slide-gate control 20 and the tundish level measurement device 22. Similarly, the computer receives input for the actual gate position, if available, from ladle slide-gate control 24 through the tundish level indicator control 26. Various desired setpoints are fed manually, namely a mold level setpoint 28, tundish level setpoint 30 and speed reference 32. Actual speed 34 is also fed to the computer. These signals are used to control the liquid level in the mold based on the calculated measured level and the various setpoints for the system. In the event control of the level cannot be attained by movement of the ladle and tundish gates speed control is initiated to maintain the proper level.

I claim:

1. A method of measuring and controlling the level of an elevated temperature liquid in a container, said method comprising:

(a) converting to digital form the electrical voltage signal outputs of a plurality of temperature sensing means located at spaced elevations on a wall of said container above and below the expected level of liquid therein, said electrical signal outputs being indicative of the temperature profile along said wall due to the liquid in the container;

(b) periodically scanning the converted signals in periodically scanning the converted signals of the temperature sensing means in sequence with respect to the location of said sensing means on the wall of the container;

(c) determining from the scanned signals the location of the uppermost sensing means, n, having a converted signal value, $S_n$, of magnitude indicative of a temperature below the liquid level in the container;

(d) calculating a fraction, F, of the spacing between the sensing means, n, and the next above sensing means, $n-1$, at which the measured liquid level lies, said fraction being determined by the relation $F=(S_{n-1}-So)/(Se-So)$ wherein $S_{n-1}$ is the converted signal value of the $n-1$ sensing means, Se is a converted signal value at a location where the liquid level is estimated to lie, Se being calculated as a function $Se = p \times m$ where p has a value within the range from 0.50 to 0.90 and m is the average of at least one of the largest converted signal values on each scan; and, So is calculated as a function $So = c \times m$ on an initial scan where c has a value within the range from 0 to 0.50 and is less than p; So being reset on subsequent scans at (i) $S_{n-1}$ whenever $S_n$ falls within the range of values from Se to a value at a predetermined percentage greater than Se and (ii) $S_{n-2}$ whenever $S_n$ falls within the range of values from Se to a value at a predetermined percentage less than Se, so as to avoid negative values of F due to changes of the level of liquid in the container;

(e) calculating the measured liquid level from, n, and, F, with respect to their location on said container; and (f) controlling addition and discharge of liquid to and from said container based on said measured liquid level.

2. The method of claim 1 further comprising setting a value Se for all sensing means having converted signal values greater than Se and a value So for all sensing means having converted signal values less than So on any particular scan.

* * * * *